Nov. 7, 1933.  R. KELLER  1,933,858
REGULATING SYSTEM
Filed April 7, 1932
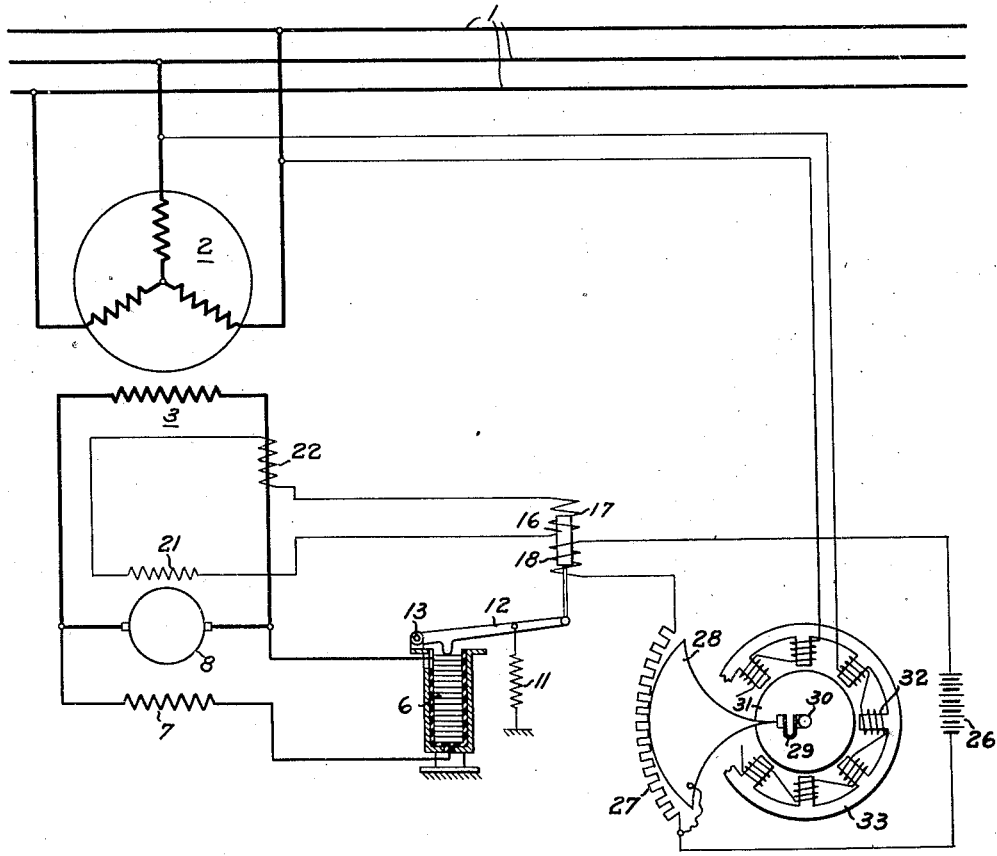

Patented Nov. 7, 1933

1,933,858

UNITED STATES PATENT OFFICE 1,933,858

REGULATING SYSTEM

Robert Keller, Ennetbaden, Switzerland, assignor to Aktiengesellschaft Brown Boveri & Cie., Baden, Switzerland, a joint-stock company of Switzerland Application April 7, 1932, Serial No. 603,694, and in Germany April 22, 1931

6 Claims. (Cl. 171—229)

This invention relates to improvements in regulating systems and particularly to a system for regulating the output voltage of a generator by regulating the degree of excitation thereof.

Voltage regulating systems for electric generators from which the voltage delivered is to remain within predetermined limits require the use of a device which operates automatically. A pile of carbon disks connected into the excitation circuit of the generator and provided with means for varying the pressure on the pile is among the more common means used heretofore for the purpose of regulating the output voltage of such generator. Such means may be electromagnets by which the pressure on the pile and hence the resistance of the pile may be varied. Such magnets are frequently provided with vibrating contacts which make and break a circuit continuously, thus affording a continuous supervision or control over the output voltage of the generator. Such contacts, however, have the disadvantage that substantially continuous arcing occurs thereon and that the regulator, therefore, requires continuous attention to maintain the contacts in good operating condition. Further, carbon pile regulators are not suitable for the regulation of large generators because the voltage cannot be regulated within sufficiently close limits and the regulator over-shoots or passes beyond the predetermined limits in both directions of operation. Such over-shooting or hunting of the regulator is very undesirable because the voltage will then vary within wide limits. Neither can such regulators be used with high speed generators because the action of the regulator is too slow.

It is, therefore, among the objects of the present invention to provide a voltage regulating system for generators employing a carbon pile resistance in which system means are employed for continuously securing exact adjustment of the pressure on the carbon pile and hence accurate control of the resistance thereof.

Another object of the invention is to provide a voltage regulating system for generators in which a carbon pile resistance is employed and is provided with means to prevent over-shooting of the voltage limits or so-called hunting of the regulator.

Another object of the invention is to provide a voltage regulating system for large electric current generators in which a carbon pile resistance is employed in conection with a torque motor operated by the output voltage or an induction disk type regulator to secure regulation of the output voltage of the generator within predtermined limits.

Another object of the invention is to provide means associated with the excitation circuit of an electric generator, which means will operate quickly upon change of the generator output in cooperation with other means to control the excitation of the generator by variation of the pressure on a carbon pile in the circuit of the exciter of the generator.

Objects and advantages other than those above set forth will be apparent from the following description when read in connection with the accompanying drawing which schematically illustrates one embodiment of the present invention showing a carbon pile resistance in the excitation circuit of a generator, the action of the carbon pile being cooperatively controlled by changes in the current flowing in the excitation circuit of the generator and by an induction disk type regulator operating in response to the output voltage of the generator.

Referring more particularly to the drawing by characters of reference, the reference numeral 1 designates an electric line which is supplied by a generator comprising the armature windings 2 and the excitation or field winding 3. The excitation winding 3 is connected with an excitation machine having a field winding 7 and an armature 8. The degree of excitation of the generator 2, 3 is controlled by varying the amount of pressure on and hence the amount of the resistance of the carbon pile 6 which varies the excitation of field 7 and hence varies the effect of the exciter on the generator.

The pressure on the carbon pile 6 is produced by a spring 11 acting on a lever 12, pivotally mounted at 13, and acting against an electromagnet having the armature 16 thereof pivotally connected with the lever 12. The electromagnet has two coils 17 and 18 wound and acting in opposite directions relative to each other, the coil 17 being connected in series with an auxiliary field winding 21 of the exciter 7, 8 and a current transformer 22 connected in the circuit of the excitation winding 3 of the generator. The coil 18 of the electromagnet is connected with a source of current 26 such as the auxiliary source for the generating station through a resistance 27. The amount of resistance 27 in circuit with coil 18 and current source 26 is varied by a torque motor of any suitable character such as the induction disk type instrument illustrated which comprises generally a contact segment 28 mounted by means of a spring 29 on the shaft 30 of an induction disk or a wound rotor 31 upon which a torque is produced by coils 32 wound on suitable pole pieces 33, the coils 32 being connected with the terminals of the generator.

During the normal operation of the generator and its associated exciter, the resistance 27 is thus varied in response to the output voltage of the generator 2, 3 which results in variation of the current delivered from the auxiliary source of current 26 to the coil 18 directly in response to the output voltage of the generator. It will be understood that the induction regulator is also provided with suitable damping means and suitable means for returning the contactor 28 thereof to the original position, such means being well known in the art and not, therefore, herein illustrated and described.

When a disturbance, such, for example, as a short circuit on the line, occurs in the output circuit of the generator a current is induced in the excitation winding 3 thereof which operates to momentarily over excite the generator and, thereby, tend to maintain the generator in synchronism. Such induced current in the winding 3 also operates to induce a current in the secondary winding of the current transformer 22 which flows through the auxiliary field excitation winding 21 of the exciter machine and through coil 17 of the relay 16. The flow of current through the winding 21 causes such winding to momentarily operate as a separately excited field winding cooperating with the main field excitation winding 7; and, as the coil 17 operates to oppose the action of coil 18, such flow of current through the coil 17 causes, in cooperation with the spring 11, the lever 12 to compress and thereby reduce the resistance of the carbon pile 6 with resultant increased excitation of the exciter machine, which operates to further increase the energization of winding 3 and thereby increase the tendency to maintain the generator in synchronism. The described flow of current through the coil 17 being of momentary duration only the resistance of the carbon pile would, unless otherwise controlled, be immediately again increased with resultant overshooting of the regulation limits in both directions and would, accordingly, cause hunting of the regulating system.

Such hunting is, however, prevented by the use of a rotary type regulator such as shown in that the torque on the disk is varied in direct response to the output voltage of the generator. The amount of resistance 27 in circuit with coil 18 of the electromagnet is thus varied directly responsive to the output voltage of the generator. Coil 18 will thus oppose the action of coil 17 and will limit the movement of lever 12 which prevents such change of the resistance of the carbon pile as would cause over-shooting of the regulation limits. Hunting of the regulating system is, therefore, prevented by the rotary type regulator.

Although but one embodiment of the present invention has been illustrated and described, it is apparent to those skilled in the art that various modifications and changes may be made therein without departing from the spirit of the invention or from the scope of the appended claims.

It is claimed and desired to secure by Letters Patent:

1. In a system for regulating the output voltage of a generator having an excitation machine connected therewith, a carbon pile connected with the excitation machine of the generator, a lever for varying the pressure on the said carbon pile, a spring acting on said lever, an electromagnet acting on said lever in opposition to said spring, said electromagnet having a plurality of coils arranged to act in opposition to each other on the armature thereof, means operable responsive to the rate of changes in the output current of said generator for energizing one of said coils, and means for controlling the degree of energization of another of the coils of said electromagnet to vary the action thereof in response to the output voltage of the generator.

2. In a system for regulating the output voltage of a generator by controlling the operation of an excitation machine therefor, a carbon pile connected with the excitation machine of the generator, a lever for varying the pressure on the said carbon pile, a spring acting on said lever, an electromagnet acting on said lever in opposition to said spring, said electromagnet having a plurality of coils arranged to act in opposition to each other on the armature, means operable responsive to changes in the output current of said generator for energizing one of said coils, a resistance connected with another of the coils of said electromagnet, a source of electric current connected with said another of the coils of said electromagnet and with said resistance, and means for varying the amount of said resistance in circuit with the coil and with said source of current in response to the output voltage of the generator.

3. In a system for regulating the output voltage of a generator by controlling the operation of an excitation machine therefor, a carbon pile connected with the excitation machine for the generator, a lever for varying the pressure exerted on the said carbon pile, a spring acting on said lever, an electromagnet acting on said lever in opposition to said spring, said electromagnet having a plurality of coils, means operable responsive to changes in the output load of said generator for energizing one of said coils, a resistance, a source of electric current connected with another of the coils of said electromagnet and with said resistance, and a rotary type regulator connected with the terminals of the generator to vary the amount of said resistance in circuit with the said another coil of said electromagnet in response to the output voltage of the generator.

4. In a system for regulating the output voltage of a generator, a carbon pile connected with the excitation machine for the generator, a lever for varying the pressure on said carbon pile, a spring acting on said lever, an electromagnet acting on said lever in opposition to said spring, said electromagnet having a plurality of coils, a source of electric current connected with one of the coils, means for controlling the amount of current supplied by said source in response to the output voltage of the generator, and means for energizing the other of the coils of said electromagnet in response to rate of changes in the output load of the generator.

5. In a system for regulating the output voltage of a generator, a carbon pile connected with the excitation machine for the generator, a lever for varying the pressure on said carbon pile, a spring acting on said lever, an electromagnet acting on said lever in opposition to said spring, said electromagnet having a plurality of coils arranged to act in opposition to each other on the armature, a source of electric current connected with one of the coils, means for controlling the amount of current supplied by said source in response to the output voltage of the generator, and a current transformer connected with the excitation winding of the generator to energize the other of the coils of said electromagnet in response to changes in the excitation of the generator.

6. In a system for regulating the output voltage of a generator, a carbon pile connected with the excitation machine for the generator, a lever for varying the pressure on said carbon pile, a spring acting on said lever, an electromagnet acting on said lever in opposition to said spring, said electromagnet having a plurality of coils arranged to act in opposition to each other on the armature, a source of electric current connected with one of the coils, means for controlling the amount of current supplied by said source in response to the output voltage of the generator, a current transformer connected into the excitation circuit of the generator, and an auxiliary winding connected in series with the secondary winding of said transformer and the other of the coils of said electromagnet to energize the same in response to changes in the output of the generator.

ROBERT KELLER.